(12) United States Patent
Kaganoi et al.

(10) Patent No.: US 7,095,742 B2
(45) Date of Patent: Aug. 22, 2006

(54) PACKET PROCESSING UNIT

(75) Inventors: Teruo Kaganoi, Tokyo (JP); Dai Shizume, Tokyo (JP); Yasuyuki Ikegai, Tokyo (JP)

(73) Assignee: NEC Corporation, Tokyo (JP)

( * ) Notice: Subject to any disclaimer, the term of this patent is extended or adjusted under 35 U.S.C. 154(b) by 945 days.

(21) Appl. No.: 10/091,392

(22) Filed: Mar. 7, 2002

(65) Prior Publication Data

US 2003/0012198 A1 Jan. 16, 2003

(30) Foreign Application Priority Data

Jul. 11, 2001 (JP) ............................ 2001-210161

(51) Int. Cl.
*H04L 12/28* (2006.01)
*H04L 12/56* (2006.01)
*G06F 12/00* (2006.01)

(52) U.S. Cl. ................... 370/392; 370/419; 370/395.1; 711/109

(58) Field of Classification Search ................ 370/389, 370/392, 395.1, 419, 395.7; 711/108; 365/49
See application file for complete search history.

(56) References Cited

U.S. PATENT DOCUMENTS

| 5,438,535 | A | 8/1995 | Lattibeaudiere | |
|---|---|---|---|---|
| 6,181,698 | B1 * | 1/2001 | Hariguchi | 370/392 |
| 6,374,326 | B1 * | 4/2002 | Kansal et al. | 711/108 |
| 6,411,620 | B1 * | 6/2002 | Takase et al. | 370/390 |
| 6,549,519 | B1 * | 4/2003 | Michels et al. | 370/238 |
| 6,553,031 | B1 * | 4/2003 | Nakamura et al. | 370/392 |
| 6,606,681 | B1 * | 8/2003 | Uzun | 711/108 |
| 6,741,596 | B1 * | 5/2004 | Hayashi | 370/395.1 |

FOREIGN PATENT DOCUMENTS

| JP | 2000-151709 | 5/2000 |
|---|---|---|
| JP | 2000-244571 | 9/2000 |
| JP | 2001-156840 | 6/2001 |

* cited by examiner

*Primary Examiner*—Chau Nguyen
*Assistant Examiner*—Kerri M. Dyke
(74) *Attorney, Agent, or Firm*—Foley & Lardner LLP

(57) ABSTRACT

A packet receiving circuit splits the packet received from a transmission channel into a fixed length of cells and outputs the cells, a search key extracting circuit extracts a predetermined search key from the above-mentioned cells, a CAM performs retrieval based on the above-mentioned search key and outputs a memory address corresponding to the search key, a matching entry address receiving and associative data address transmitting circuit calculates the memory address of an associative data memory based on the above-mentioned memory address and outputs the information stored in the associative data memory as associative data, a search result (associative data) receiving circuit receives the above-mentioned associative data and performs header updating and destination address of the above-mentioned cells, and a packet transmitting circuit outputs the above-mentioned cells in the form of a packet to a transmission channel.

20 Claims, 7 Drawing Sheets

PACKET PROCESSING UNIT

BACKGROUND OF THE INVENTION

The present invention relates to a packet processing unit for performing a packet destination address process and the like in a router and the like.

Packet processing units have been used in a router and the like for performing packet destination address process and the like.

Conventionally, a packet processing unit provides methods of performing a packet destination address process, a solving process of Q o S information or an updating process of a packet header when required and the like through a software process.

But a rapid processing can not be implemented by the methods of performing the packet destination address process and the like through the software process.

Accordingly, a method implemented by a hardware configuration is considered for solving the above-mentioned problem.

However, in the event of implementing the destination address process through hardware, a plurality of lookup tables such as a Multi Field Classify table for performing a classification to identify packet flow by a multi field, a flow destination address table for performing forward with awareness of the flow and the like must be installed for processing a multi protocol or a multi layer. And a configuration providing circuits or tables only for performing each of the above-mentioned processes individually causes a problem of enlarged scale of a circuit.

SUMMARY OF THE INVENTION

It is therefore an object of the present invention to provide a packet processing unit capable of performing a packet destination address process rapidly with a simple configuration.

According to the present invention, a packet processing unit for performing destination address of a packet received from a transmission channel and outputting the above-mentioned packet to the above-mentioned transmission channel, including;

packet receiving means for outputting the packet received via the above-mentioned transmission channel in the form of split cells of a fixed length, search key extracting means for extracting a predetermined search key from the above-mentioned cells received from the above-mentioned packet receiving means, Content Addressable Memory (e.g., mentioned as "CAM" hereinafter) for performing retrieval based on the above-mentioned search key extracted by the above-mentioned search key extracting means and outputting a memory address corresponding to the above-mentioned key, associative data storing means for storing at least address information and outputting the information stored in the input memory address, associative data reading means for calculating the memory address of the above-mentioned associative data storing means based on the above-mentioned memory address received from the above-mentioned CAM and supplying the memory address to the above-mentioned associative data storing means, destination address means for performing destination address of a particular cell based on the information of the above-mentioned associative data storing means read by the above-mentioned associative data reading means, and packet transmitting means for putting the cells received from the above-mentioned destination address means back to a packet and outputting the packet to the above-mentioned transmission channel is provided. The packet processing unit is characterized in that the above-mentioned packet receiving means, search key extracting means, CAM, associative data storing means, associative data reading means, destination address means, and packet transmitting means perform a pipeline process.

Packet receiving means outputs the packet received via the above-mentioned transmission channel in the form of the split cells of a fixed length. Search key extracting means extracts a predetermined search key from the above-mentioned cells received from the above-mentioned packet receiving means. CAM performs the retrieval based on the above-mentioned search key extracted by the above-mentioned search key extracting means and outputs the memory address corresponding to the above-mentioned key. Associative data reading means calculates the memory address of the above-mentioned associative data storing means based on the above-mentioned memory address received from the above-mentioned CAM and supplies the memory address to the above-mentioned associative data storing means. Destination address means performs destination address of the particular cell based on the information of the above-mentioned associative data storing means read by the above-mentioned associative data reading means. And packet transmitting means puts the cells received from the above-mentioned destination address means back to a packet and outputs the packet to the above-mentioned transmission channel. At the time, the above-mentioned packet receiving means, search key extracting means, CAM, associative data storing means, associative data reading means, destination address means, and packet transmitting means perform a pipeline process.

Incidentally, a duration of each stage of the above-mentioned packet receiving means, retrieving key extracting means, CAM, associative data storing means, associative data reading means, destination address means, and packet transmitting means can be so configured as to be set not more than arrival time interval of the packet input to the above-mentioned packet receiving means.

And processing time of the above-mentioned packet receiving means, retrieving key extracting means, CAM, associative data storing means, associative data reading means, destination address means, and packet transmitting means can be so configured as to be set shorter than the duration of each stage.

Further, the packet processing unit can be so configured as to comprise maintenance means for performing maintenance of at least one of the above-mentioned CAM or associative data storing means during idle time of the above-mentioned stages.

And further, the packet processing unit can be so configured as to comprise buffer means for timing adjustments between the above-mentioned transmission channel and the above-mentioned packet receiving means and between the above-mentioned transmission channel and the above-mentioned packet transmitting means.

Furthermore, the packet processing unit can be so configured as to comprise arithmetic processing means for performing predetermined processes with respect to the above-mentioned cell on at least one of a following step to the above-mentioned packet receiving means or a preceding step to the above-mentioned packet transmitting means.

DETAILED DESCRIPTION OF THE PREFERRED EMBODIMENTS

Figure 1:
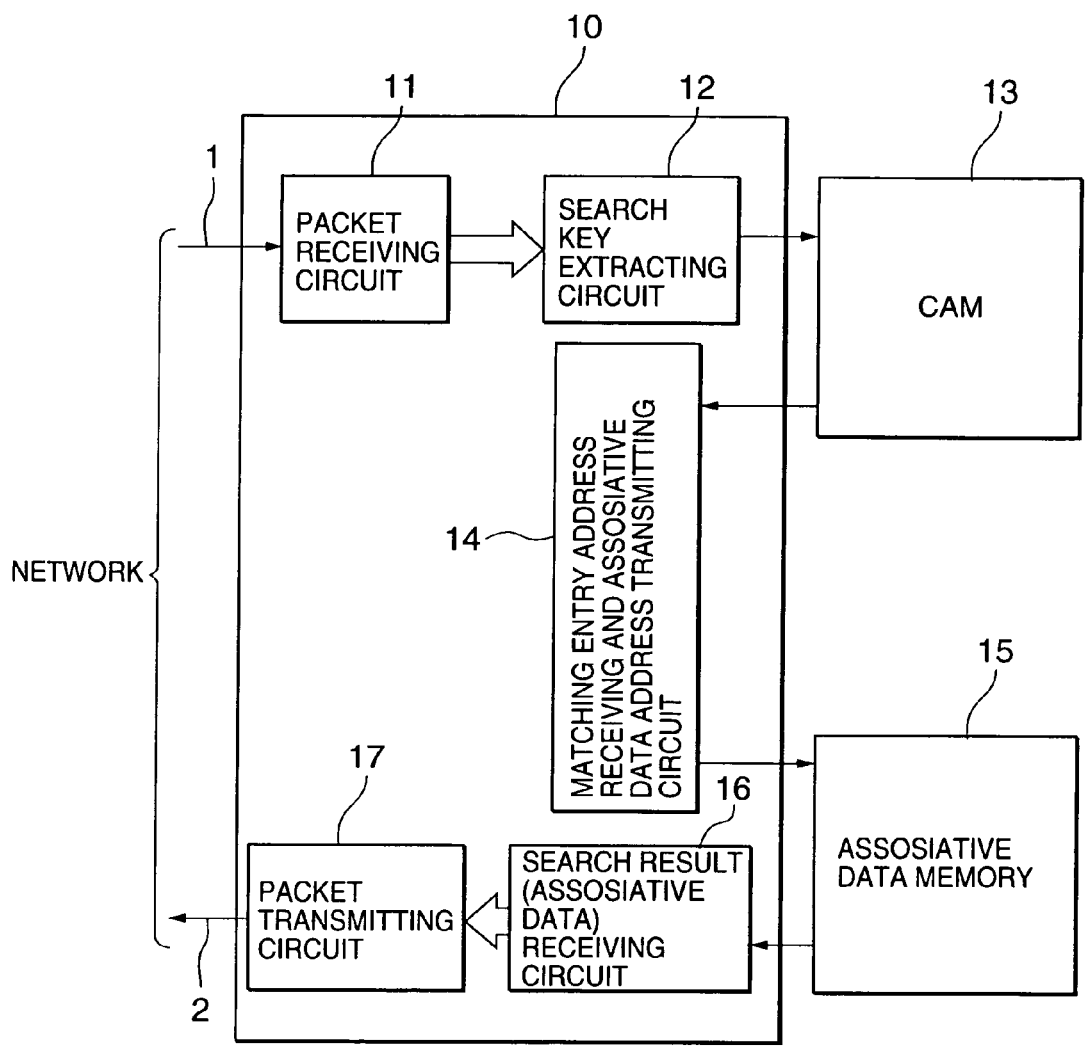
FIG. 1 is a block diagram of a packet processing unit relating to a first embodiment of the present invention.

FIG. 1 is a block diagram of a packet processing unit relating to a first embodiment of the present invention. One of equipments to which the packet processing unit of the first embodiment is applicable is, for example, a router.

In FIG. 1, 11 indicates a packet receiving circuit as packet receiving means, 12 indicates a search key extracting circuit as search key extracting means, 13 indicates a CAM which is capable of pipeline retrieval, 14 indicates a matching entry address receiving and associative data address transmitting circuit as associative data extracting means, 15 indicates an associative data memory as associative data storing means, 16 indicates a search result (associative data) receiving circuit as destination address means, and 17 indicates a packet transmitting circuit as packet transmitting means. And each of the above-mentioned components is configured by hardware.

Incidentally, the CAM 13 has not only a memory function but also a retrieval function. When identical data as data stored in the CAM in advance is input to the CAM 13, the CAM 13 outputs an address of the CAM 13 in which the data is stored. The CAM 13 is capable of LPM (Longest Prefix Match) retrieval and retrieval of various bit widths and also capable of rapid retrieval independent of kind and bit width of the search key. And additionally, as the CAM 13 has a characteristic of being able to perform retrieval without incurring degradation while data stored in the CAM 13 increases, rapid retrieval is possible even in the event that an amount of data becomes greater.

On the other hand, in the associative data memory 15 stores address information, class information and the like of the packet.

Incidentally, the packet receiving circuit 11, the search key extracting circuit 12, the matching entry address receiving and associative data address transmitting circuit 14, the search result (associative data) receiving circuit 16, and the packet transmitting circuit 17 compose a packet processing portion 10 as packet processing means.

The packet receiving circuit 11 receives a packet of a variable length such as an IP (Internet Protocol) packet and outputs a signal in the form of separated cells of a fixed length such as ATM (Asynchronous Transfer Mode) cells. Hereinafter, a signal output from the packet receiving circuit 11 is called cell.

Cells output from the packet receiving circuit 11 are processed switching each stage of each component (the packet receiving circuit 11, the search key extract circuit 12, the CAM 13, the matching entry address receiving and associative data address transmitting circuit 14, the associative data memory 15, the search result (associative data) receiving circuit 16, and the packet transmitting circuit 17) of the packet processing unit by a pipeline of n clock per stage.

As the address information of an IP packet and information of Q o S are stored in a header portion in most cases. In the event that a packet of a size larger than a cell is input to the packet receiving circuit 11 and the packet is split into a plurality of cells to be output from the packet receiving circuit 11, only the first arriving cell is processed in each stage and not any particular process is required of the second arriving and cells thereafter. Therefore, processes afterward are performed only on the first arriving cells and each stage of the pipeline is switched without processing other following cells.

At first, the search key extracting circuit 12 extracts a required search key out of the cells received from the packet receiving circuit 11. Next, retrieval is executed in the CAM 13 by inputting the above-mentioned search key to the CAM 13 capable of pipeline retrieval. Incidentally, the search key is a key for solving the destination to transfer the packet and classifying the kind of the packet transferred in detail. And in the event of the IP packet, for example, fields of a destination address of a header, an address of a sender, a protocol type, a service type and the like are used as the search key.

The CAM 13 performs retrieving process based on the search key input from the search key extracting circuit 12 and outputs a memory address (a memory address of the CAM 13 in which the search key is stored) of the CAM 13 which is hit as a result of the retrieval.

The matching entry address receiving and associative data address transmitting circuit 14 receives the above-mentioned memory address from the CAM 13 and calculates a memory address of the associative data memory 15 in which actual associative data is stored from the above-mentioned memory address based on rules to link an address of the CAM 13 to an address of the associative data memory 15.

Then, actual associative data can be obtained from the associative data memory 15 by giving the memory address from the matching entry address receiving and associative data address transmitting circuit 14 to the associative data memory 15. That is, the associative data memory 15 outputs data (associative data) stored in the above-mentioned memory address input from the matching entry address receiving and associative data address transmitting circuit 14 to the search result (associative data) receiving circuit 16.

The search result (associative data) receiving circuit 16 performs required header-updating and destination address with respect to the packet (directly to the cell) based on the above-mentioned associative data and outputs the packet to the packet transmitting circuit 17. The packet transmitting circuit 17 merges a plurality of cells split by the packet receiving circuit 11 into one packet and outputs the updated packet to a network.

A packet processing becomes possible while keeping the speed without congestion even in the event that the packets arrive successively from the packet receiving circuit 11 through the pipeline of the present configuration by providing a stage of the pipeline configured by n-clock at a value not larger than the shortest arriving time interval (equal to a cell size of a fixed length) of the packets.

And with providing the pipeline of n-clock per stage, retrieval processing of not only one but plural numbers of retrieval per packet in the search key extracting circuit 12 and the CAM 13 becomes possible and information for executing not only one but a plurality of processes with respect to one packet can be obtained.

Further, each stage of the pipeline process can be provided with idle time periodically by operating the above-mentioned pipeline configuration at a speed slightly higher than the speed with which the packet arrives from the packet receiving circuit 11 actually. And maintenance such as inspections, updating and the like of the data stored in the CAM 13 or the external memory 15 can be performed using the above-mentioned idle time by the maintenance means not shown in the drawings.

Figure 2:
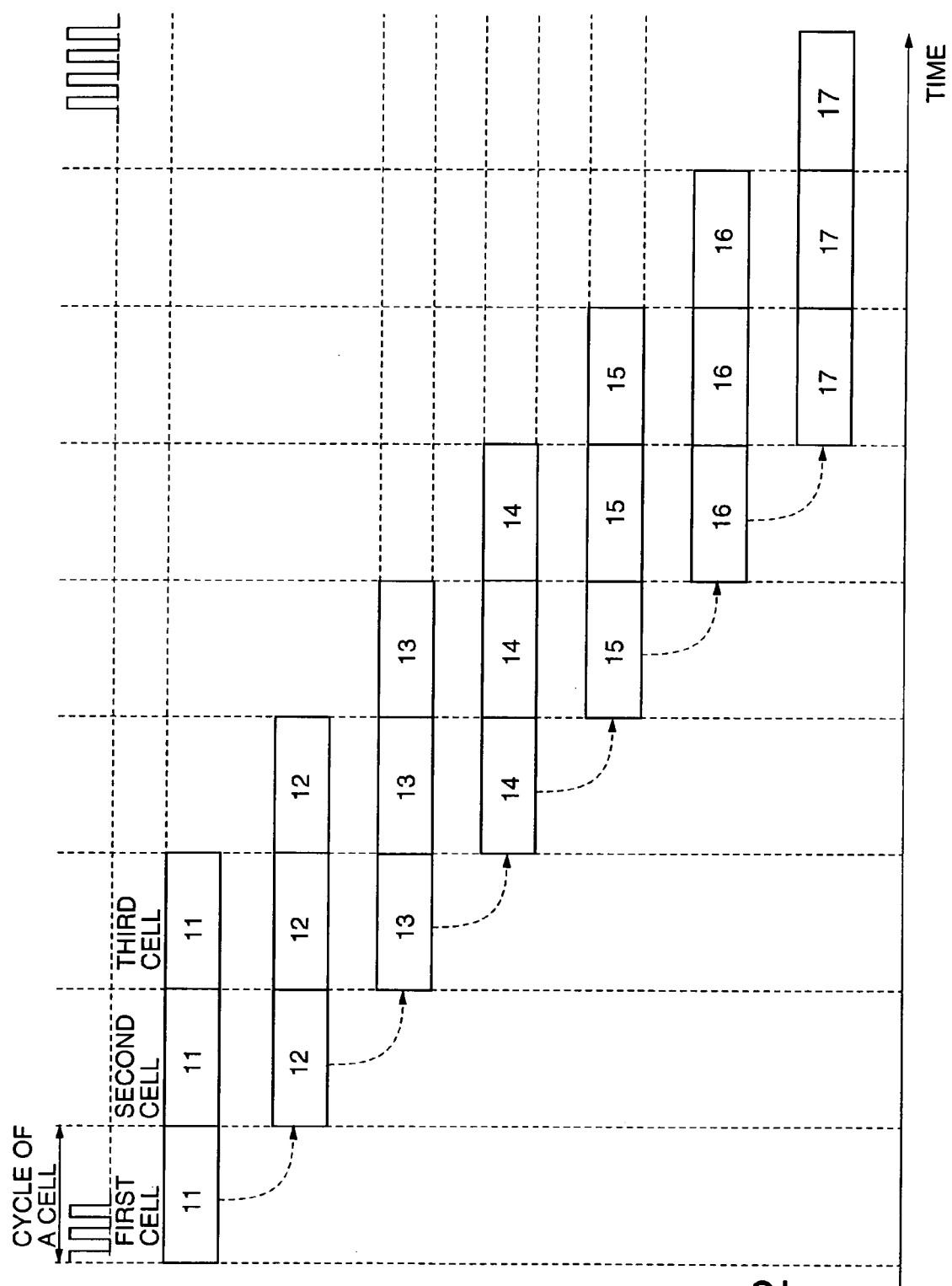
FIG. 2 is a timing diagram of the packet processing unit relating to the first embodiment of the present invention.

FIG. 2 is a timing diagram of the packet processing unit shown in FIG. 1. In order to simplify the description, an event that three cells arrive successively is illustrated in FIG. 2. And a clock cycle (clock number n per stage) of the pipeline is assumed to be eight clocks. The whole of the process comprises seven pipeline stages indicated by numerals 11 through 17. Each of the numerals of 11 through 17 illustrates the process of the components having numerals corresponding to the components of the packet processing unit shown in FIG. 1, that is, the packet receiving circuit 11 through the packet transmitting circuit 17. Hereafter, an operation of a first embodiment of the present invention is described in detail referring to FIGS. 1 and 2.

The packet receiving circuit 11 receives the packet from a network via a transmission channel 1 and outputs a fixed length of cells to which the received packet split. In the present embodiment, each of the above-mentioned cells has a length of eight clocks. The above-mentioned cells are processed switching each stage of the search key extract circuit 12 through the packet transmitting circuit 17 by the eight-clock pipeline thereafter.

At first, the packet receiving circuit 11 determines what type of the packet is received and what is the search key required while receiving the packet. As a method of classification according to the packet type, for example, in the event of Ethernet frame in which an IP packet is capsulated, the packet type can be classified as an IP packet by determining the field (Payload Type) in a header of the Ethernet. And as the search key, for example, in the event of the IP packet as mentioned above, fields of a destination address of a header, an address of a sender, a protocol type, a service type and the like are provided.

Next, the search key extracting circuit 12 extracts a search key required out of the cell and gives a retrieval instruction by outputting the above-mentioned search key to the CAM 13. Incidentally, the present embodiment is premised on that the CAM 13 is capable of performing the pipeline retrieval, that is, retrieval in response to each clock. Therefore, on the stage of performing the process, the search key extracting circuit 12 extracts not only a kind of search key but also more than one kind of search keys which fit in one stage (retrievals are possible to a maximum of eight times as one stage provides eight clocks in the present embodiment) and also can give a retrieval instruction to the CAM 13. For an increase of kinds of retrieval more, number of stage on which the search key extracting circuit 12 performs the process can be increased or the cycle number n of the pipeline clock can be set larger.

The CAM 13 receives the search key from the search key extracting circuit 12 and sends the address hit in the result of retrieval by latency of m-clock (m: natural number) to the matching entry address receiving and associative data address transmitting circuit 14. And the matching entry address receiving and associative data address transmitting circuit 14 receives the above-mentioned address to calculate an address (associative data address) of the associative data memory 15 in which actual associative data is stored and gives the associative data address to the associative data memory 15. In the event of executing plural kinds of retrieval on the processing stage 12 of the search key extracting circuit 12, the above-mentioned operations are repeated with respect to each of the retrieval.

Incidentally, as the delivery process of the search key from the search key extracting circuit 12 to the CAM 13, the outputting process of the associative data address from the CAM 13 to the matching entry address receiving and associative data address transmitting circuit 14 and the reading instruction of the associative data to the associative data memory 15 based on the above-mentioned associative data address are executed in parallel, performing the retrieval processing without waste at all times.

The associative data obtained as a result of the retrieval is output from the associative data memory 15 to the search result (associative data) receiving circuit 16, and the search result (associative data) receiving circuit 16 performs required header-updating and destination address with respect to the packet (directly to the cell) based on the above-mentioned associative data. Incidentally, in the event that plural kinds of retrieval instructions are given in the search key extracting circuit 12, as plural kinds of associative data are also obtainable, a process in response to associative data obtained in the result of each retrieval can be performed and required process can be executed by combining the associative data of plural kinds or assigning priorities to the associative data.

Finally, an updated packet is output from the packet transmitting circuit 17 to the network via the transmission channel 2. In FIG. 2, three cells arrive to each stage successively and in the event that a first and a second arriving cells configure one packet, the cells are determined whether the cell is the first cell or not on the stage of the packet receiving circuit 11 or the search key extracting circuit 12. And in the event that the cell is not the first arriving, the above-mentioned processes are not performed and each pipeline is switched.

Additionally, idle time (stage) can be provided periodically during the pipeline process by operating the pipeline configuration at a speed slightly higher than the speed with which the packet arrives from the packet receiving circuit 11 actually and maintenance of the CAM 13 or the external memory 15 can be performed using the above-mentioned idle time by the maintenance means not shown in the drawings.

As mentioned above, a packet processing unit relating to the first embodiment is a packet processing unit particularly for performing destination address of a packet received from a transmission channel and outputting the above-mentioned packet to the above-mentioned transmission channel, including;

the packet receiving circuit 11 for outputting the packet received via the transmission channel 1 in the form of split cells of a fixed length, the search key extracting circuit 12 for extracting a predetermined search key from the above-mentioned cells received from the packet receiving circuit 11, the CAM 13 for performing retrieval based on the above-mentioned search key extracted by the search key extracting circuit 12 and outputting a memory address corresponding to the above-mentioned key, the associative data memory 15 for storing at least address information and outputting the information stored in the input memory address, the matching entry address receiving and associative data address transmitting circuit 14 for calculating the memory address of the associative data memory 15 corresponding to the above-mentioned memory address of the CAM 13 based on the above-mentioned memory address received from the CAM 13 and supplying the memory address to the associative data memory 15, the search result (associative data) receiving circuit 16 for performing destination address of a particular cell based on the information of the associative data memory 15 read by the matching entry address receiving and associative data address transmitting circuit 14, and the packet transmitting circuit 17 for generating packets by merging the cells from the search result (associative data) receiving circuit 16 and outputting the packet to a transmission channel 2. The packet processing unit is characterized in that the packet receiving circuit 11, the search key extracting circuit 12, the CAM 13, the associative data memory 15, the matching entry address receiving and associative data address transmitting circuit 14, the search result (associative data) receiving circuit 16, and the packet transmitting circuit 17 perform the pipeline process.

Therefore, processing becomes possible while keeping the speed without congestion even in the event that the packets arrive successively from the packet receiving circuit 11 through the pipeline of the present configuration by providing an n-clock at a value not larger than the shortest arriving time interval (equal to a cell size of a fixed length) of the packets. Accordingly, the packet processing unit of the present invention is applicable to, for example, a forwarding engine of a very high speed router.

And with providing the pipeline of n-clock per stage, retrieval processing of not only one but plural numbers of retrieval per packet in the search key extracting circuit 12 and the CAM 13 becomes possible and not only one but a plurality of processes with respect to one packet can be executed or a process with respect to one kind of associative data to which priorities are assigned obtained through a plurality of retrievals can be executed.

Further, control and retrieval in one circuit become possible by installing a plurality of tables in one CAM 13, which contribute to scale-down of a circuit.

Figure 3:
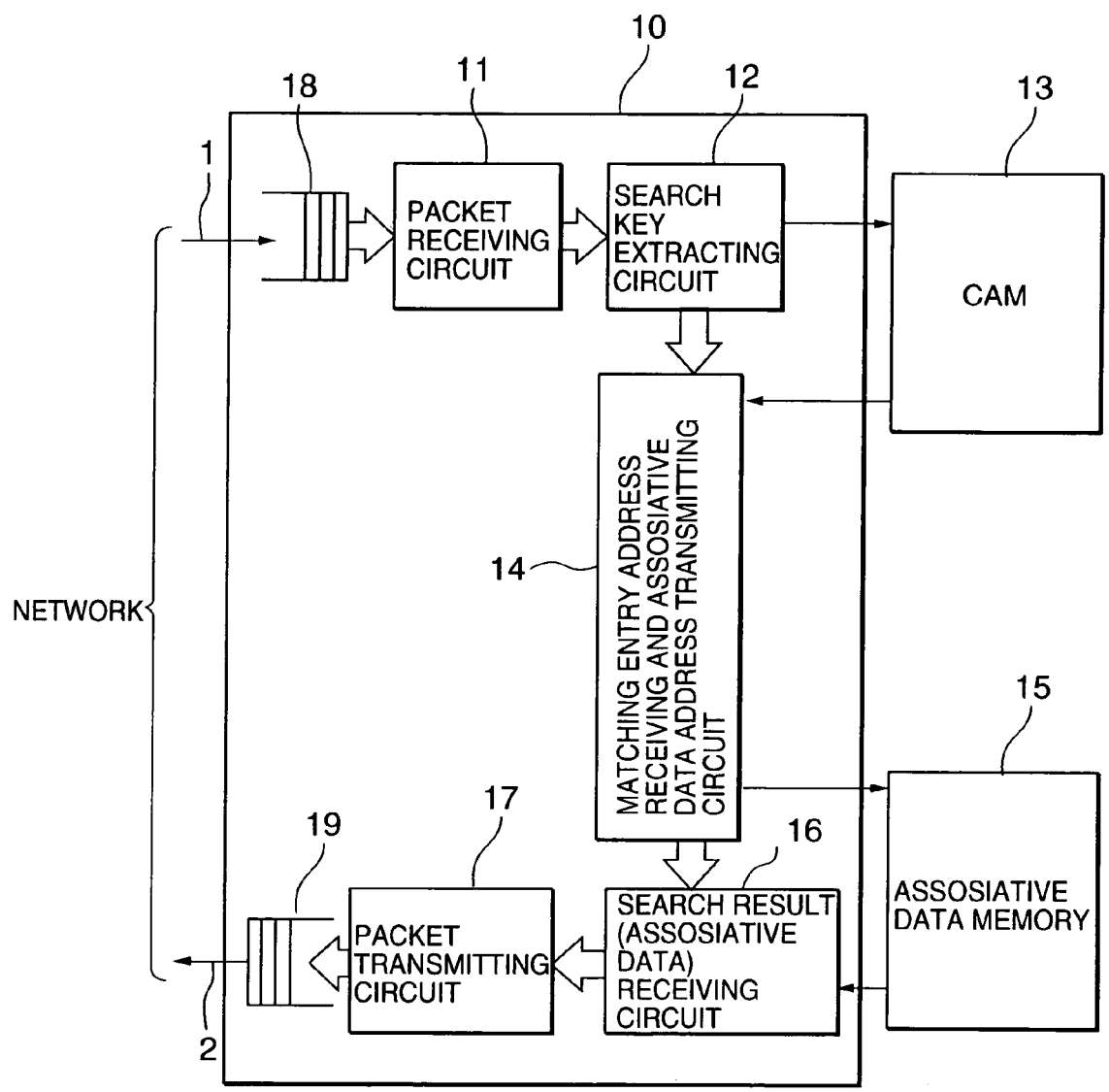
FIG. 3 is a block diagram of the packet processing unit relating to a second embodiment of the present invention.
Figure 4:
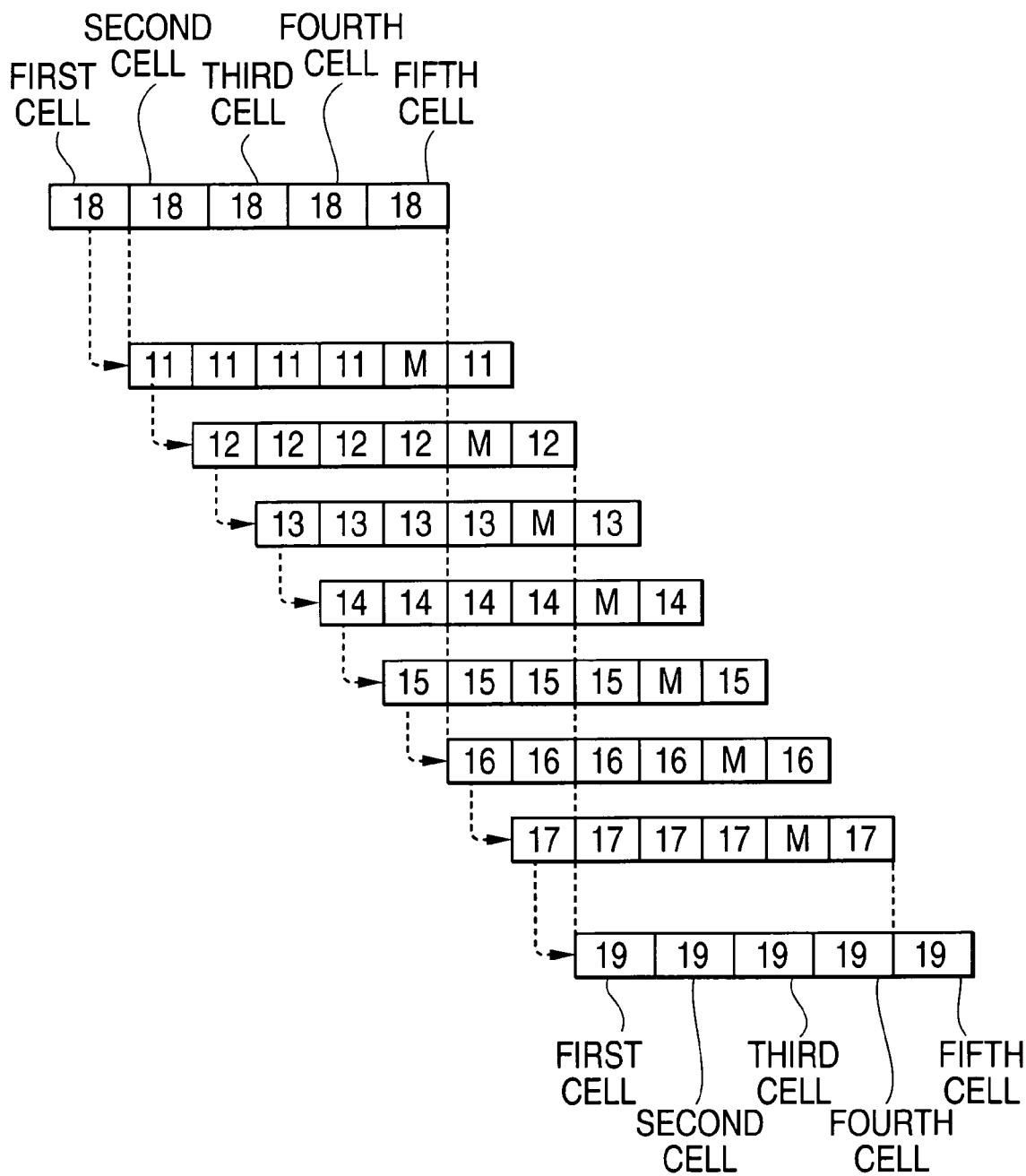
FIG. 4 is a timing diagram of the packet processing unit relating to the second embodiment of the present invention.

FIG. 3 is a block diagram of the packet processing unit relating to a second embodiment of the present invention and numbers therein are corresponding to the numbers in FIG. 1. And FIG. 4 is a timing diagram for showing the packet processing unit shown in FIG. 3.

The second embodiment differs from the above-mentioned first embodiment in comprising an inputting buffer 18 as buffer means for adjusting timing of processing for outputting the received packet to the packet receiving circuit 11 and an outputting buffer 19 as buffer means for adjusting timing of processing for outputting the packet received from the packet transmitting circuit 17.

In the second embodiment, the pipeline stage from the packet receiving circuit 11 to the packet transmitting circuit 17 has a cycle shorter than the cycle of inputting the packet to the inputting buffer 18 and the cycle of outputting the packet from the outputting buffer 19. Accordingly, the inputting buffer 18 and the outputting buffer 19 are installed for performing the adjustment of the cycle of transmitting the packet between the transmission channels 1 and 2 and timing of processing in the packet processing unit.

Thus, idle time (M in FIG. 4) free from any kind of process can be provided in the packet processing unit by shortening the pipeline cycle in the packet processing unit than the cycle of externally arriving packets. And the above-mentioned idle time can be utilized for performing updating of data stored in the CAM 13 or the associative data memory 15 without any complicated conflict control.

FIG. 4 is an example of the timing diagram. Incidentally, cell cycle input to the inputting buffer 18 and cell cycle output from the outputting buffer 19 are equal to each other and the pipeline process from the packet receiving circuit 11 to the packet transmitting circuit 17 is executed in a cycle of four fifths of the cell cycle input to the inputting buffer 18 and cell cycle output from the outputting buffer 19.

Therefore, even in the event that the cells arrive successively in the cycle of the inputting buffer 18 and the outputting buffer 19, a stage free from any kind of process is surely provided with one in five cycles with regard to the stages of the packet receiving circuit 11 through the packet transmitting circuit 17. Consequently, the maintenance of the CAM 13 and the associative data memory 15 can be performed on the above-mentioned stage without any complicated conflict control.

Figure 5:
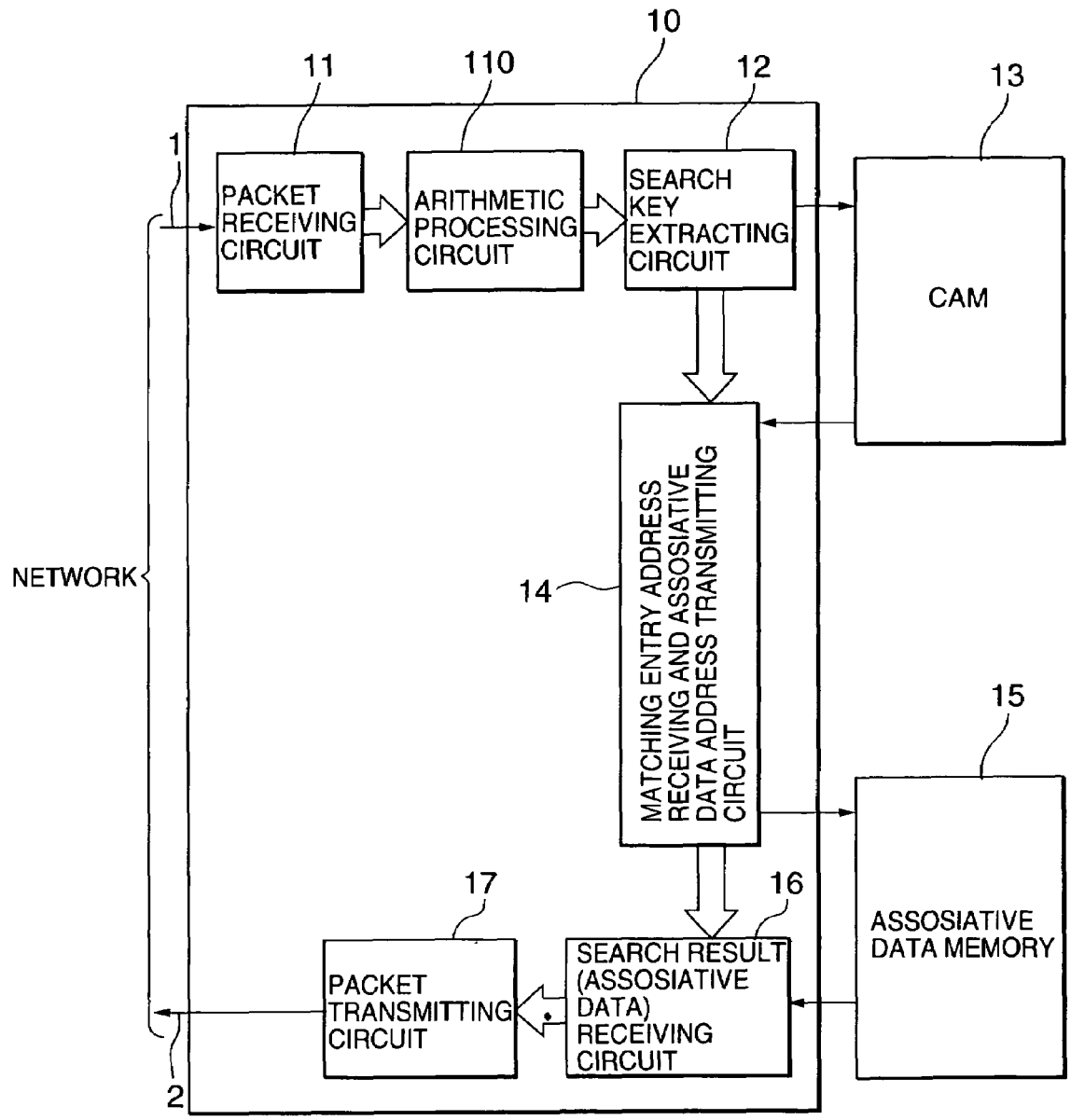
FIG. 5 is a block diagram of the packet processing unit relating to a third embodiment of the present invention.

FIG. 5 is a block diagram of the packet processing unit relating to a third embodiment of the present invention and numbers therein are corresponding to the numbers in FIG. 1.

The third embodiment differs from the above-mentioned first embodiment in providing an arithmetic processing circuit 110 between the packet receiving circuit 11 and the search key extracting circuit 12.

Although the above-mentioned first and second embodiments are so arranged as to process only a first arriving cell when the packet of a variable length is received, a possibility arises where a predetermined arithmetic must be performed all over the packet such as encryption of a packet in a router and the like. Therefore, the arithmetic processing circuit 110 in which a predetermined arithmetic process is executed with respect not only to the first arriving cell but also to other cells is provided. As an example of a predetermined arithmetic process with respect to packets, a process of putting Frame Check Sequence (e.g., mentioned as "FCS" hereinafter) at an end of a packet of the Ethernet is named. Thus, it becomes possible to cope with the event of executing the arithmetic process all over the packet of a variable length.

Figure 6:
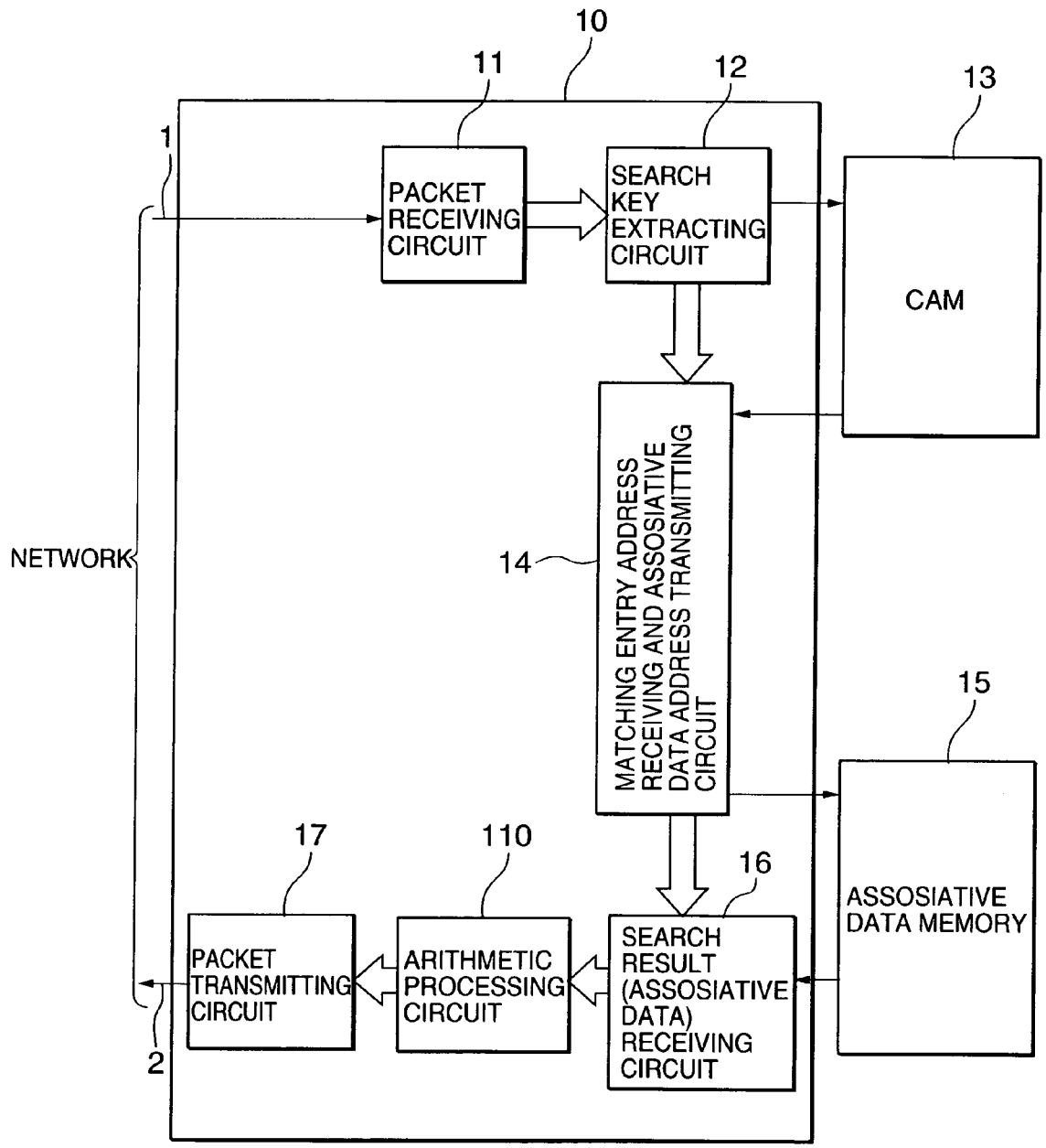
FIG. 6 is a block diagram of the packet processing unit relating to a fourth embodiment of the present invention.

FIG. 6 is a block diagram of the packet processing unit relating to a fourth embodiment of the present invention and numbers therein are corresponding to the numbers in FIG. 3.

The fourth embodiment differs from the above-mentioned third embodiment in providing the arithmetic processing circuit 110 between the search result (associative data) receiving circuit 16 and the packet transmitting circuit 17.

In the third embodiment, a predetermined arithmetic can be executed with respect to all over a packet which is not updated. But the forth embodiment differs from the third embodiment in executing the predetermined arithmetic process with respect to all over the packet after updating the header-information by the search result (associative data) receiving circuit 16. As an example of the above-mentioned predetermined arithmetic process, a process of putting FCS at an end of a packet of the Ethernet is named as mentioned above. Thus, it becomes possible to cope with the event of executing the arithmetic process on all over the packet of a variable length.

Figure 7:
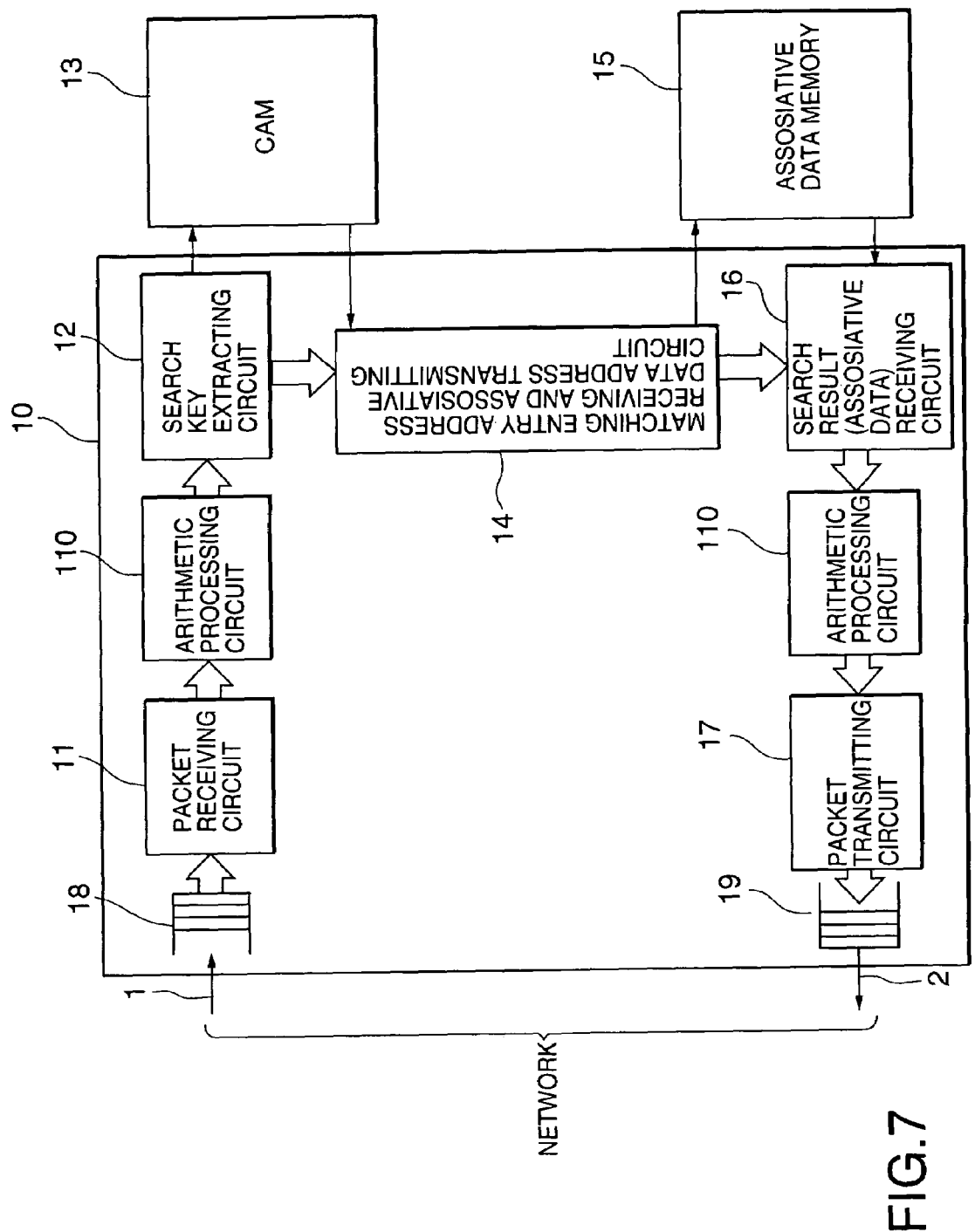
FIG. 7 is a block diagram of the packet processing unit relating to a fifth embodiment of the present invention.

FIG. 7 is a block diagram of the packet processing unit relating to a fifth embodiment of the present invention and numbers therein are corresponding to the numbers in FIGS. 1, 3, 5 and 6.

A configuration of the fifth embodiment includes all components of the second embodiment through the fourth embodiment and consequently, the maintenance of the CAM 13 and the associative data memory 15 can be performed without any complicated conflict control.

Additionally, as the above-mentioned third embodiment through the fifth embodiment, with providing the arithmetic processing circuit 110 for performing a predetermined process (for example, a process of encryption or inclusion of FCS) on all over the packet by performing a predetermined process with respect to the cells at least on one of a following step to the packet receiving circuit 11 and a preceding step to the packet transmitting circuit 17, performing a specific arithmetic process with respect to the packet when received or executing a predetermined arithmetic process with respect to all over the packet after updating the header information become possible.

According to the present invention, processes of packet destination address and the like can be performed rapidly with a simple configuration.

What is claimed is:

1. A packet processing unit, comprising:
    packet receiving means for outputting a packet received via a first transmission channel in the form of split cells of a fixed length,
    search key extracting means for extracting a predetermined search key from said cells output from said packet receiving means,
    a CAM for performing retrieval of a memory address based on said search key extracted by said search key extracting means and for outputting said memory address,
    associative data storing means for storing at least destination information and for outputting information stored at an input memory address,
    associative data reading means for calculating a particular memory address of said associative data storing means based on said memory address output from said CAM and for supplying the particular memory address to said associative data storing means,
    destination address means for updating a destination address of a particular cell of said cells based on particular information output from said associative data storing means that is stored at said particular memory address in said associative data storing means and for outputting said cells, and
    packet transmitting means for combining the cells output from said destination address means into an updated packet and for outputting said updated packet to a second transmission channel,
    wherein said packet receiving means, said search key extracting means, said CAM, said associative data reading means, said associative data storing means, said destination address means, and said packet transmitting means are configured to perform processing as stages of a pipeline.

2. The packet processing unit as claimed in claim 1, wherein a duration of each stage of said stages of said pipeline is set at not more than an arriving time interval at which packets are received by said packet receiving means.

3. The packet processing unit as claimed in claim 2, wherein a processing time of each of said packet receiving means, said search key extracting means, said CAM, said associative data storing means, said associative data reading means, said destination address means, and said packet transmitting means is set at not more than the duration of each stage of said stages of said pipeline.

4. The packet processing unit as claimed in claim 2, further comprising;
    buffer means for providing a timing adjustment between said first transmission channel and said packet receiving means and between said second transmission channel and said packet transmitting means.

5. The packet processing unit as claimed in claim 2, further comprising;
    arithmetic processing means for performing a predetermined process with respect to said cells as at least one of a following step to said packet receiving means or a preceding step to said packet transmitting means.

6. The packet processing unit as claimed in claim 3, further comprising:
    buffer means for providing a timing adjustment between said first transmission channel and said packet receiving means and between said second transmission channel and said packet transmitting means.

7. The packet processing unit as claimed in claim 3, further comprising:
    arithmetic processing means for performing a predetermined process with respect to said cells as at least one of a following step to said packet receiving means or a preceding step to said packet transmitting means.

8. The packet processing unit as claimed in claim 1, further comprising:
    maintenance means for performing maintenance of at least one of said CAM during an idle time of said CAM or said associative data storing means during an idle time of said associative data storing means.

9. The packet processing unit as claimed in claim 8, further comprising:
    buffer means for providing a timing adjustment between said first transmission channel and said packet receiving means and between said second transmission channel and said packet transmitting means.

10. The packet processing unit as claimed in claim 8, further comprising:
    arithmetic processing means for performing a predetermined process with respect to said cells as at least one of a following step to said packet receiving means or a preceding step to said packet transmitting means.

11. The packet processing unit as claimed in claim 1, further comprising:
    buffer means for providing a timing adjustment between said first transmission channel and said packet receiving means and between said second transmission channel and said packet transmitting means.

12. The packet processing unit as claimed in claim 11, further comprising:
    arithmetic processing means for performing a predetermined process with respect to said cells as at least one of a following step to said packet receiving means or a preceding step to said packet transmitting means.

13. The packet processing unit as claimed in claim 1, further comprising:
    arithmetic processing means for performing a predetermined process with respect to said cells as at least one of a following step to said packet receiving means or a preceding step to said packet transmitting means.

14. The packet processing unit as claimed in claim 1, wherein said second transmission channel is a same transmission channel as said first transmission channel.

15. A packet processing unit, comprising:
- a packet receiving circuit for receiving a packet over a first transmission channel, and for splitting said packet into a plurality of cells while receiving said packet, and for outputting said plurality of cells, each cell of said plurality of cells having a fixed length;
- a search key extracting circuit for extracting one or more search keys from a first cell of said plurality of cells output by said packet receiving circuit and for outputting said one or more search keys;
- a content addressable memory for retrieving one or more memory addresses based on said one or more search keys output by said search key extracting circuit, and for outputting said one or more memory addresses;
- a matching entry address receiving and associative data address transmitting circuit for calculating one or more particular memory addresses based on said one or more memory addresses output by said content addressable memory, and for outputting said one or more particular memory addresses;
- an associative data memory for outputting one or more associative data results that are read from said associative data memory at said one or more particular memory addresses that are output by said matching entry address receiving and associative data address transmitting circuit;
- a search result receiving circuit for modifying said first cell of said plurality of cells based on at least one of said one or more associative data results output by said associative data memory, and for outputting said plurality of cells after modifying said first cell; and
- a packet transmitting circuit for combining said plurality of cells output from said search result receiving circuit into a modified packet, and for outputting said modified packet over a second transmission channel.

16. The packet processing unit of claim 15,
wherein said second transmission channel is a same transmission channel as said first transmission channel.

17. The packet processing unit of claim 15,
wherein each cell of said plurality of cells passes through each of said packet receiving circuit, said search key extracting circuit, said content addressable memory, said matching entry address receiving and associative data address transmitting circuit, said associative data memory, said search result receiving circuit, and said packet transmitting circuit.

18. The packet processing unit of claim 15,
wherein said packet receiving circuit, said search key extracting circuit, said content addressable memory, said matching entry address receiving and associative data address transmitting circuit, said associative data memory, said search result receiving circuit, and said packet transmitting circuit are configured to perform processing as stages of a pipeline.

19. The packet processing unit of claim 18,
wherein each stage of said pipeline is configured to perform processing for each cell of said plurality of cells in a predetermined amount of time; and
wherein said search key extracting circuit is configured to extract two or more search keys from said first cell during said predetermined amount of time and is configured to output said two or more search keys; and
wherein said content addressable memory is configured to retrieve two or more memory addresses based on said two or more search keys during said predetermined amount of time, and is configured to output said two or more memory addresses.

20. The packet processing unit of claim 18,
wherein a time between said packet receiving circuit receiving said packet and said packet transmitting circuit outputting said modified packet is less than a time interval between arrival of packets to said packet receiving circuit; and
wherein said content addressable memory is configured to allow for updating during an idle time when no processing is being performed by said content addressable memory.

* * * * *